United States Patent [19]

Mark et al.

[11] 4,379,910

[45] Apr. 12, 1983

[54] FLAME RETARDANT AROMATIC POLYCARBONATE COMPOSITIONS MADE FROM FLUORINATED DIPHENOLS

[75] Inventors: Victor Mark, Evansville; Charles V. Hedges, Mount Vernon, both of Ind.

[73] Assignee: General Electric Co., Mt. Vernon, Ind.

[21] Appl. No.: 221,460

[22] Filed: Dec. 31, 1980

[51] Int. Cl.³ ............................................. C08G 63/62
[52] U.S. Cl. ..................... 528/202; 525/439; 525/470; 528/204; 528/370; 528/372
[58] Field of Search ............. 528/202, 204, 370, 372; 525/439, 470

[56] References Cited

U.S. PATENT DOCUMENTS

| | | | |
|---|---|---|---|
| 2,435,014 | 1/1948 | Niederl | |
| 3,028,365 | 4/1962 | Schnell et al. | 260/47 |
| 3,207,794 | 9/1965 | Haines | 568/727 |
| 3,220,978 | 11/1965 | Jaquiss | 260/47 |
| 3,248,366 | 4/1966 | Schmitt et al. | 260/47 |
| 3,340,310 | 9/1967 | Gilbert et al. | 568/726 |
| 3,388,097 | 6/1968 | Cramer | 260/47 |
| 4,115,358 | 9/1978 | Vestergaard | 260/47 |
| 4,117,018 | 9/1978 | Claveland et al. | 568/726 |
| 4,180,651 | 12/1979 | Mark | 528/202 |
| 4,182,838 | 1/1980 | Mark et al. | 528/202 |
| 4,220,583 | 9/1980 | Mark | 260/45.7 |

FOREIGN PATENT DOCUMENTS

| | | | |
|---|---|---|---|
| 6407548 | 1/1965 | Netherlands | |
| 1017988 | 1/1966 | United Kingdom | 568/726 |
| 1029750 | 5/1966 | United Kingdom | 568/726 |
| 1095959 | 12/1967 | United Kingdom | 568/726 |

OTHER PUBLICATIONS

Korshak et al. Izv. Akad. Nauk SSSR., Ser. Khim 1965 (9), pp. 1649–1654.
Cevaert-Photo Producten "French Patent Abstract, Pharmaceuticals, Photographic" French 21/5/65 Indian 22 and 29.5.65 vol. 5, No. 25, FR. 8496/1,285,486.
Korshak et al. "Chem. Abstract" vol. 64 (1966) 6766e.
Korshak et al. "Chem. Abstract" vol. 64 (1966) p. 8321h.

*Primary Examiner*—H. S. Cockeram
*Attorney, Agent, or Firm*—Martin B. Barancik; William F. Mufatti

[57] ABSTRACT

Improved flame retardance is imparted to high molecular weight aromatic polycarbonate resins by selecting appropriate fluorinated diphenols and incorporating them in homopolymers or copolymers. The fluorinated diphenols have at least one fluorinated alkyl or fluorinated aryl group upon the methylene carbon atom positioned between the two phenol ring structures. The polycarbonates having improved flame retardance are made from fluorinated diphenols and halogen-containing carbonate precursors. Copolycarbonates having improved flame retardance are derived from the fluorinated diphenols and non-fluorinated diphenols. The flame retardant polycarbonates may be used in films and molded articles where improved resistance to flame is desirable.

28 Claims, No Drawings

FLAME RETARDANT AROMATIC POLYCARBONATE COMPOSITIONS MADE FROM FLUORINATED DIPHENOLS

This invention relates to aromatic polycarbonate compositions having improved flame retardance, and more particularly, to aromatic polycarbonates made from fluorinated diphenols.

BACKGROUND OF THE INVENTION

Polycarbonate polymers are well-known as excellent molding materials. Products made from polycarbonate polymers exhibit such properties as high impact strength, toughness, high transparency, excellent properties within wide temperature limits, good dimensional stability, good creep resistance and the like. It is also desirable to provide polycarbonate polymers having improved flame retardance so that products made from such polycarbonate polymers can be safely used by the consumer and also meet the increasing requirements of certain flame retardant criteria being established by local and federal government agencies as well as the manufacturers of such products. One such polycarbonate composition having improved flame retardance is disclosed in U.S. Pat. No. 4,182,838 where halogenated vinylidene diphenols are used to prepare high molecular weight aromatic polycarbonates. Other halogenated polycarbonates have also been obtained by using halogenated monomers as the main polymer building block. Examples of such polycarbonate compositions include tetrabromobisphenol-A and (3,3'-dichloro-4,4'-dihydroxy-diphenyl)-methane monomer as disclosed in U.S. Pat. No. 3,028,365.

Fluorine-containing polyarylates are described in a paper published in Izvestiya Akademii Nauk SSSR, Seriya Khimicheskaya, No. 9, pp. 1649–1654, September, 1965 (Chemical Abstracts 64, 8321h (1966). Polyesters of terephthalic acid isophthalic acids with 4,4'-(hexafluoro-isopropylidene)diphenol and with 4,4'-[alpha-(trifluoromethyl)benzylidene]diphenol were synthesized, and it was found that the replacement of CH₃ groups on the central carbon atom of the isopropylidene diphenol and the benzylidene diphenol by CF₃ groups leads to a lowering of the softening points of the polyesters based thereon. Similar monomers are described in Netherlands patent application No. 6,407,548 filed July 2, 1964, and opened for inspection on Jan. 4, 1965. The Netherlands disclosure relates to a process for the preparation of polycarbonate resin by reacting phosgene with 2,2-bis(p-hydroxyphenyl)-1,1,3,3-tetrafluoro-1,3-dichloropropane. It was disclosed therein that the polycarbonate resin had good thermal stability and low vapor permeability. The monomers in the foregoing references were prepared from the corresponding ketones and phenol, and in all cases, the positions on the central carbon atom of the diphenol have been substituted with halogenated methyl groups or halogenated methyl groups in combination with phenyl groups.

In U.S. Pat. No. 3,388,097, 4,4'-(1,1,1-tri-fluoroethylidene)diphenol was made from trifluoroacetaldehyde hydrate and phenol in the presence of anhydrous hydrogen fluoride in a Hastelloy bomb. The product was distilled under reduced pressure at 165°–170° C. and 0.5–0.6 mm. Hg. Polyesters were made from these perhaloalkyl bisphenols and specified aromatic acid halides. However, it is noted that the acid catalyst is anhydrous hydrogen fluoride which has to be handled in a special alloy bomb, and that the reaction product had to be distilled at 165°–170° C. at reduced pressure. The bisphenols which are disclosed for making polyesters in U.S. Pat. No. 3,388,097, have the structure:

$$HO-Ar_1-Z-Ar_1-OH \quad (1)$$

wherein $Ar_1$ is para-phenylene, and Z is a divalent radical having the formula:

wherein R and R' may be the same or different and represent perhalogenated lower alkyl groups, fluorine and chlorine being the preferred halogen species, with the provision that R' may represent hydrogen when R represents a perfluorinated lower alkyl group. These bisphenols are prepared by the anhydrous hydrogen fluoride catalyzed condensation of an appropriate halogenated ketone or aldehyde with two molecules of an appropriate phenol. However, there is no suggestion of high molecular weight aromatic polycarbonates or of improved flame retardance of the polyesters derived from the fluorinated diphenols.

In U.S. Pat. No. 4,220,583, flame retardancy of polycarbonate compositions was improved by admixing a halogen-free aromatic polycarbonate and minor amounts of partially fluorinated polyolefin and minor amounts of an organic alkali metal salt or an organic alkaline earth metal salt, or mixtures thereof. Although these polycarbonate compositions containing flame retardant organic salts exhibit good flame retardancy, it is always desirable to achieve flame retardancy without resorting to additives, especially when transparent compositions are required.

In general, the prior art references recognize that flame retardance can be imparted to polycarbonates made from brominated or chlorinated monomeric building blocks. None of these references, however, discloses or suggests that a high molecular weight polycarbonate resin having improved flame retardance can be obtained from fluorinated diphenols.

SUMMARY OF THE INVENTION

Accordingly, it is the primary object of the present invention to provide aromatic polycarbonate compositions having improved flame retardance.

It is another object of this invention to provide polycarbonates having fluorinated alkyl or fluorinated aryl side chains in the monomeric units.

Still another object of this invention is to provide aromatic polycarbonates which can be linear or branched homopolymers or copolymers, as well as mixtures thereof, or polymeric blends made from the fluorinated diphenols having one fluorinated alkyl or fluorinated aryl group upon the methylene carbon atom of the diphenol.

It has now been found that high molecular weight aromatic polycarbonates have improved flame retardance when the polycarbonates have the general formula:

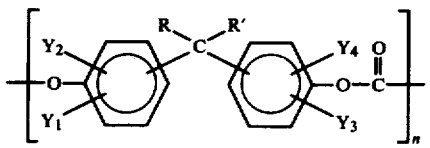

(3)

wherein n is an integer from about 5 to 1,000; R is a fluroinated alkyl or fluorinated aryl radical; R' is a fluorinated alkyl radical, a fluorinated aryl radical, hydrogen or an alkyl radical; and $Y_1$, $Y_2$, $Y_3$ and $Y_4$ are each independently selected from the group consisting of hydrogen, alkyl radical, chlorine, and bromine. As used herein, $Y_1$, $Y_2$, $Y_3$ and $Y_4$ can be the same or different or can be mixtures of hydrogen, alkyl, chlorine or bromine. In accordance with the present invention, R must be a fluorinated alkyl radical, preferably having from 1 to about 22 carbon atoms, straight chain or a branched, or a fluorinated aryl radical having from 6 to about 16 carbon atoms. In certain preferred embodiments, R is a perfluorinated alkyl or aryl radical. In those cases where R' is an alkyl radical, it contains from 1 to about 6 carbon atoms which may be arranged in a linear or branched configuration, and where R' is a fluorinated alkyl or aryl radical, it is defined the same as R.

Although the polycarbonates can be prepared by any well-known process, a typical process for preparing a polycarbonate having improved flame retardance comprises reacting a halogen-containing carbonate precursor with a fluorinated diphenol in a mixed aqueous organic solvent system containing sufficient base to neutralize the halogen halide derived from the carbonate precursor, said fluorinated diphenol having one fluorinated alkyl or aryl group upon the methylene carbon atom joining the two phenol rings and having the general formula:

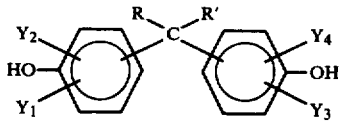

(4)

wherein R is a fluorinated alkyl or fluorinated aryl radical; R' is a fluorinated alkyl radical, a fluorinated aryl radical, hydrogen or an alkyl radical; and $Y_1$, $Y_2$, $Y_3$ and $Y_4$ are each independently selected from the group consisting of hydrogen, alkyl radical, chlorine and bromine. As used herein, fluorinated diphenol is the fluorinated diphenol of Formula (4) with at least one fluorinated alkyl group upon the methylene carbon atom positioned between the phenol ring structures. The fluorinated diphenols may have only one fluoroalkyl group upon the methylene carbon atom positioned between the phenol ring structures, and accordingly, there is conservation of fluorine over many of the prior art fluorinated diphenols which have two fluoroalkyl groups thereon. In view of the fact that the fluorine determines the price of the materials, the present invention provides lower cost fluorinated diphenol monomers for the preparation of the flame-retardant polycarbonate compositions.

In accordance with the present invention, the aromatic polycarbonate compositions may be homopolymers, as shown in Formula (3) or copolymers which contain polycarbonate units derived from both Formula (4) and nonfluorinated bisphenols having the general formula:

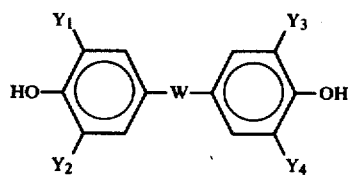

(5)

wherein W denotes $C_1$–$C_9$ alkylene, $C_2$–$C_9$ alkylidene, $C_5$–$C_{15}$ cycloalkylidene, $C_5$–$C_{15}$ cycloalkylene, a single bond, —O—, —S—, —SO—, —SO$_2$— or —CO—, and $Y_1$, $Y_2$, $Y_3$ and $Y_4$ are the same as defined in Formula (4). Thus, the aromatic polycarbonate composition may comprise a copolymer having aromatic polycarbonate units derived from the fluorinated diphenols having one fluorinated alkyl group upon the methylene carbon atom and bisphenols or substituted bisphenols without fluorine substituents as shown in Formula (5), or the foregong homopolymers or copolymers or mixtures thereof may be blended with linear aromatic polycarbonates, branched aromatic polycarbonates, or linear and branched aromatic polycarbonates and the like. The aromatic polycarbonates of the invention can be linear or branched homopolymers or copolymers as well as mixtures thereof or polymeric blends. These high molecular weight polycarbonates are typically prepared by reacting diphenols with appropriate carbonate precursors.

DESCRIPTION OF THE PREFERRED EMBODIMENTS

In the present invention, improved flame retardance is imparted to high molecular weight, aromatic polycarbonate resins by selecting appropriate diphenols to be used with the carbonate precursor in the polymerization reaction. This is achieved by providing a fluorinated alkyl group upon the methylene carbon atom positioned between the phenol ring structures of 4,4'-bis(hydroxyphenyl)methane. The central carbon atom (the methylene carbon) positioned between the phenol ring structures is substituted with a hydrogen atom or an alkyl radical and with a fluorinated alkyl or fluorinated aryl group as illustrated in general Formula (4) for the monomer used in the present invention wherein R, $Y_1$, $Y_2$, $Y_3$ and $Y_4$ are each defined above. In preferred embodiments, the fluorinated alkyl group represented by R is from about 1 to about 22 carbon atoms and may be partially fluorinated or completely fluorinated (perfluorinated alkyl group). When any one or all of the positions designated $Y_1$, $Y_2$, $Y_3$ and $Y_4$ are alkyl radicals, in preferred embodiments the alkyl radicals have from about 1 to about 4 carbon atoms. Furthermore, the alkyl radicals represented by R and R' or by $Y_1$, $Y_2$, $Y_3$ and $Y_4$ may be straight chain or branched chains or mixtures thereof.

It will be noted that when the methylene carbon atom positioned between the phenol ring structures has one hydrogen atom, there is little or no steric hindrance in the molecule. Therefore, all isomers of the fluorinated diphenol structures or mixtures thereof can be used in preparing the flame retardant polycarbonates of the present invention. Thus, all positional isomers of the fluorinated diphenols of Formula (4) are possible, however, in most cases the isomers are mainly ortho and para, that is, the hydroxy groups are in the ortho and para positions relative to the fluorinated alkyl methylene carbon atom positioned between the two phenol ring structures. In the most preferred embodiments, the isomer is the para isomer used in conjunction with carbonate precursors to form a polycarbonate in accordance with the present invention.

Typical examples of fluorinated diphenols which may be used to make the flame-retardant polycarbonate compositions, include, for example, 4,4'-(2,2,2-trifluoroethylidene)diphenol, 4,4'-(2,2-difluoroethylidene)diphenol, 4,4'-(pentafluoropropylidene)diphenol, 2,4'-(2,2,2-trifluoroethylidene)diphenol, 2,2'-(pentafluoropropylidene)diphenol, 4,4'-(perfluoro-octylidene)diphenol, 4,4'-(perfluorodecylidene)diphenol, 4,4'-(octafluorobutylidene)diphenol, 4,4'-(1-methyltrifluoroethylidene)bis(2,6-dimethylphenol), 4,4'-(1-methyltrifluoroethylidene)bisphenol, and the like, including various combinations of fluorinated alkyl groups ranging from about 1 to about 22 carbon atoms, wherein R in the foregoing formulas (3) and (4) represents from about 1 to about 22 carbon atoms and fluorinated aryl groups ranging from 6 to about 16 carbon atoms, wherein R in the foregoing formulas (3) and (4) represents an aryl group having from about 6 to 16 carbon atoms. In the foregoing list of diphenols, the complete alkyl group is from 2 to about 23 carbon atoms when the methylene carbon atom located between the phenol ring structures is included in the alkyl group. Naturally, in the preparation of the flame-retardant polycarbonates, any mixture of the fluorinated diphenols may be used in conjunction with the carbonate precursor to form a polycarbonate made from mixed fluorinated diphenols.

The fluorinated diphenols may be obtained from any source or by any synthesis. Fluorinated diphenols may be made in pressure bombs in accordance with the teachings of U.S. Pat. No. 3,388,097 where bisphenols are prepared by the hydrogen fluoride condensation of an appropriate fluorinated carbonyl compound with 2 molecules of an appropriate phenol. More specifically, the fluorinated diphenols used in the present invention are preferably made from fluorinated aldehydes and ketones, some of which are commercially available in the form of the free aldehyde, the aldehyde hydrate, the hemiacetal, the hemiketal, the ketal or the acetal. However, any form of the fluorinated aldehyde or ketone may be used to make the fluorinated diphenols including the foregoing listed forms, the free form of the aldehyde, the trimer or tetramer form of the aldehyde, the cyclic form of the aldehyde and the open-chain form of the aldehyde, the free form of the ketone, the ketone hydrate and the like. Examples of the aldehydes include perfluoroacetaldehyde, perfluoropropionaldehyde, perfluorobutylraldehyde, perfluoro-octanaldehyde or any of the partially or completely fluorinated aldehydes having from 2 to about 23 carbon atoms. The foregoing aldehydes, including mixtures thereof, are reacted with the desired phenols in an acid catalyzed reaction to form the fluorinated diphenols used in the present invention. Similarly, fluorinated ketones are the precursors of diphenols when R' is not hydrogen.

In preparing the polycarbonate compositions which may be homopolymers, copolymers, mixtures of homopolymers, mixtures of copolymers or mixtures of homopolymers/copolymers, block copolymers, and the like, various techniques well-known in the art may be employed. It is possible to employ two or more different fluorinated diphenols having the structures of the fluorinated diphenols discussed above, or to employ conventional diphenols, such as bisphenol-A, with the fluorinated diphenol. Blends of any of these materials can also be used to obtain the improved flame-retardant properties of the aromatic polycarbonates. It is also possible to mix or blend the improved flame-retardant aromatic polycarbonates of this invention with conventional aromatic polycarbonates to obtain improved flame-retardant properties of the respective resins. They can be blended as desired to obtain the desired V rating per UL-94 for any particular aromatic polycarbonate, or they can be formed as copolymers which contain units of the fluorinated diphenols of this invention in the polymer backbone of the carbonate copolymer together with non-fluorinated components. The high molecular weight polycarbonate compositions of the present invention having improved flame-retardance may thus comprise aromatic diphenol-carbonate units of the general formula:

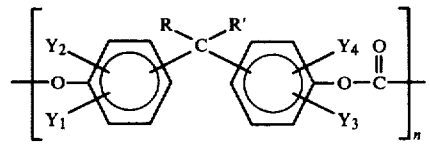

wherein n, R, R', $Y_1$, YHD 2, $Y_3$ and $Y_4$ are the same as previously defined, and they also may comprise aromatic copolycarbonates represented by the following general formula:

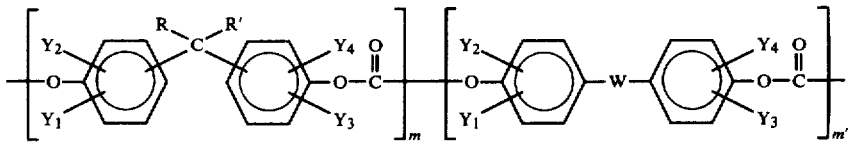

wherein R, R', W, $Y_1$, $Y_2$, $Y_3$ and $Y_4$ are the same as previously defined, and m and m' are integers from 1 to 1,000, and m+m' is at least 5. The foregoing polycarbonates may be blended with linear aromatic polycarbonates, branched aromatic polycarbonates, and mixtures of linear and branched aromatic polycarbonates, the linear and branched aromatic polycarbonates which are made from conventional diphenols, such as bisphenol-A, and other well-known substituted and unsubstituted bisphenols which form polycarbonates with carbonate precursors.

The aromatic polycarbonates having improved flame-retardance in accordance with the present invention are typically made by reacting a halogen-containing carbonate precursor with the fluorinated diphenol discussed above in a suitable medium, for example, an interfacial aqueous or a solvent system, containing sufficient alkaline material to neutralize the halogen of the carbonate precursor. Many processes are well-known in the art for preparing polycarbonate compositions from diphenols and carbonate precursors, and one skilled in the art can use such methods for preparing the polycarbonate having improved flame-retardance in accordance with the present invention. One such method of preparation is disclosed in U.S. Pat. No. 4,115,358, incorporated herein by reference, wherein at least 70 weight percent of a carbonate precursor, such as phosgene, is reacted with a dihydric phenol, such as bisphenol-A, while simultaneously adding to the reaction medium an alkali metal hydroxide, such as sodium hydroxide, to maintain a pH of 6.0 to about 10.0.

The carbonate precursor can be either a carbonyl halide, a carbonate ester or a haloformate. The carbonyl halides can be carbonyl bromide, carbonyl chloride and mixtures thereof. The carbonate esters used in the transesterification process can be diphenyl carbonate, di(-halophenyl)carbonates such as di-(chlorophenyl)carbonate, di-(bromophenyl)carbonate, di-(trichlorophenyl)carbonate, di-(tribromophenyl)carbonate, and the like, di-(alkylphenyl)carbonate such as di-(tolyl)carbonate, and the like, di-(naphthyl)carbonate, di-(chloronaphthyl)carbonate, phenyl tolyl carbonate, chlorophenyl chloronaphthyl carbonate, and the like, or mixtures thereof. The haloformates include bis-haloformates of dihydric phenols (bischloroformates of hydroquinone, bisphenol-A and the like). While other carbonate precursors will occur to those skilled in the art, carbonyl chloride also known as phosgene, is preferred.

Molecular weight regulators, acid acceptors and catalysts can also be used in obtaining the aromatic polycarbonates of this invention. The useful molecular weight regulators include monohydric phenols such as phenol, chroman-I, para-tertiarybutylphenol, para-bromophenol and the like. Preferably, phenol is employed as the molecular weight regulator. The degree of polymerization depends upon the molecular weight regulator. Techniques for the control of molecular weight are well-known in the prior art and may be used in the present process. In certain preferred embodiments the number of recurring monomeric units in the polymer chain may be about 50 to about 100 or higher, depending upon the desired properties and end use.

A suitable acid acceptor can be either an organic or an inorganic acid acceptor. A suitable organic acid acceptor is a tertiary amine such as pyridine, triethylamine, dimethylaniline, tributylamine, and the like. The inorganic acid acceptor can be either a hydroxide, a carbonate, a bicarbonate, or a phosphate of an alkali or alkaline earth metal, sodium hydroxide and potassium hydroxide being preferred.

The catalysts which can be employed are those that typically aid the polymerization of the diphenol with phosgene. Suitable catalysts include tertiary amines such as triethylamine, tripropylamine, N,N-dimethylaniline, quaternary ammonium compounds such as, for example, tetraethylammonium bromide, cetyl triethyl ammonium bromide, tetra-n-heptylammonium iodide, tetra-n-propyl ammonium bromide, tetramethylammonium chloride, tetramethyl ammonium hydroxide, tetra-n-butyl ammonium iodide, benzyltrimethyl ammonium chloride, tetramethyl ammonium hydroxide, tetra-n-butyl ammonium iodide, benzyltrimethyl ammonium chloride and quaternary phosphonium compounds such as, for example, n-butyltriphenyl phosphonium bromide and methyl triphenyl phosphonium bromide.

Also included herein are branched polycarbonates wherein a polyfunctional aromatic compound is reacted with the diphenol and carbonate precursor to provide a thermoplastic randomly branched polycarbonate. These polyfunctional aromatic compounds contain at least three functional groups which are hydroxyl, carboxyl, carboxylic anhydride, haloformyl, or mixtures thereof. Illustrative of polyfunctional aromatic compounds which can be employed include triphenols, trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenonetetracarboxylic acid, benzophenonetetracarboxylic anhydride, and the like. The preferred polyfunctional aromatic compounds are trimellitic anhydride and trimellitic acid or their acid halide derivatives.

Other well-known materials can also be employed for their intended function and include such materials as anti-static agents, mold release agents, thermal stabilizers, ultraviolet light stabilizers, reinforcing fillers such as glass and other inert fillers, foaming agents, and the like.

By the process of the present invention and by using the designated, fluorinated diphenols described above, various polycarbonate compositions can be made with various flame-ratings as desired including molded products, extruded products, films and the like made from the polycarbonate compositions. By mixing the fluorinated diphenol monomers described above with other conventional dihydric diphenol monomers, a polycarbonate composition having a flame-retardance or flame test rating can be designed or achieved. Thus, by mixing monomers of the fluorinated diphenols and, for example, bisphenol-A and forming a polycarbonate in accordance with the process of the present invention, the polycarbonate can be designed to fall within any of the various burning test ratings such as V-O, V-I or V-II. Various flame test ratings may also be achieved by mixing the aromatic polycarbonate homopolymers made from the fluorinated diphenol monomers discussed above with other conventional polycarbonates to form blends thereof, having a specific flame test rating. The blending or copolymerization may also change the glass transition temperature (Tg) or heat distortion temperature of the polymers which, in turn, determines the practical temperature range at which articles made from the polymeric composition can be used.

The following examples are set forth to more fully and clearly illustrate the present invention and are intended to be, and should be construed as being, exemplary and not limitative of the invention. Unless otherwise stated, all parts and percentages are by weight.

EXAMPLE 1

Into a mixture of 2283 grams of pure 4,4'-isopropylidenediphenol (BPA) (mp 156°–157° C.; 10.0 mole grams), 5700 grams water, 9275 grams methylene chloride, 32.0 grams phenol and 10.0 grams triethylamine were introduced, at ambient temperature, 1180 grams phosgene over a period of 97 minutes while maintaining the pH of the two-phase system at about 11; i.e., pH 10–12.5, by simultaneously adding a 25% aqueous sodium hydroxide solution. At the end of the addition period, the pH of the aqueous phase was 11.7, and the BPA content of this phase was less than 1 part per million (ppm) as determined by ultraviolet analysis.

The methylene chloride phase was separated from the aqueous phase, washed with an excess of dilute (0.01 N) aqueous HCl and then washed three times with deionized water. The polymer was precipitated by steam and dried at 95° C. The resultant, pure BPA-polycarbonate, which had an intrinsic viscosity (IV) in methylene chloride at 25° C. of 0.465 dl/g., was fed to an extruder which extruder was operated at about 265° C. (550° F.), and the extrudate was comminuted into pellets.

The pellets were then injection molded at about 315° C. (600° F.) into test bars of about 5 in. by ½ in. by about ⅛ in. thick and into stepped test squares of about 2 in. by 2 in. by about ⅛ in. and 1/16 in. thick. The ⅛ in. test bars (5 for each test result) were subjected to the flame-retardancy test procedure set forth in Underwriters' Laboratories, Inc. Bulletin UL-94, Burning Test for Classifying Materials. In accordance with this test procedure, materials that pass the test are rated either V-O, V-I or V-II based on the results of 5 specimen. The criteria for each V (for vertical) rating per UL-94 is briefly as follows:

"V-O": Average flaming and/or glowing after removal of the igniting flame shall not exceed 5 seconds and none of the specimen shall drip flaming particles which ignite absorbent cotton.

"V-I": Average flaming and/or glowing after removal of the igniting flame shall not exceed 25 seconds and the glowing does not travel vertically for more than ⅛" of the specimen after flaming ceases and glowing is incapable of igniting absorbent cotton.

"V-II": Average flaming and/or glowing after removal of the igniting flame shall not exceed 25 seconds and the specimen drip flaming particles which ignite absorbent cotton.

In addition, a test bar which continues to burn for more than 25 seconds after removal of the igniting flame is classified, not by UL-94, but by the standards of the invention, as "burns". Further, UL-94 requires that all test bars in each test group must meet the V-type rating to achieve the particular classification; otherwise, the 5 bars receive the rating of the worst single bar. For example, if one bar is classified as V-II and the other four (4) are classified as V-O, then the rating for all bars is V-II.

Impact measurements by the Notched Izod test were determined pursuant to ASTM D-256 on ⅛ in. thick test bars.

Thermal gravimetric measurements were carried out on a Perkin Elmer TGS1 instrument pursuant to ASTM D-1238, condition O.

EXAMPLE 2

The procedure of Example 1 was exactly repeated, except that one-half of the BPA (1141.5 g) was replaced with 1340 g (5.0 moles) of 4,4'-(1H-trifluoroethylidene)-bisphenol. The colorless, transparent molded parts, made from the copolycarbonate, which had a glass transition temperature of 153.6° C., were evaluated by impact tests and by the Underwriters' Laboratories Bulletin-94 test, and were found to have a V-O rating.

EXAMPLE 3

The procedure of Example 1 was repeated, except that all of the 4,4'-isopropylidenediphenol was replaced by 2680 g (10.0 moles) of 4,4'-(1H-trifluoroethylidene) bisphenol. The colorless, transparent molded parts made from the polycarbonate possessed high impact, a glass transition temperature of 158.6° C. and a V-O rating in the flammability test.

EXAMPLE 4

Repeating Example 2 with 2840 g (5.0 moles) of 4,4'-(1H-1,1-perfluoro-octylidene)bisphenol in place of the 4,4'-(1H-trifluoroethylidene)bisphenol yielded a co-polycarbonate composition which yielded tough, colorless, transparent molded parts with a 137.1° C. glass transition temperature that were V-O by the Bulletin-94 test.

EXAMPLE 5

When the procedure of Example 1 was repeated with 1680 g (5.0 moles) of 4,4'-(1-trifluoromethyltrifluoroethylidene)-bis-phenol in place of 5.0 moles of BPA, there was obtained a tough, transparent copolycarbonate with a 157° C. glass transition temperature and a V-O rating by the Bulletin-94 test.

EXAMPLE 6

Repeating the procedure of Example 1, but replacing 3.0 moles of the BPA with 3 moles of 4,4'-(1H-trifluoroethylidene)bisphenol and another 3.0 moles of BPA with 3.0 moles of 4,4'-(1-trifluoromethyltrifluoroethylidene)bisphenol yielded a tough, colorless transparent terpolycarbonate with a glass transition temperature of 160.3° C. and a V-O flammability rating.

EXAMPLE 7

When the procedure of Example 1 was repeated with 3680 g (10.0 moles) of 4,4'-(1H-perfluorobutylidene) bisphenol instead of BPA, there was obtained a colorless, transparent, tough homopolymer with 143.4° C. glass transition temperature and V-O rating by the Bulletin-94 test.

EXAMPLE 8

Repeating the procedure of Example 1 with 2820 g (10.0 moles) of 4,4'-(1-methyltrifluoroethylidene)bisphenol in place of BPA yielded a tough, colorless, transparent polycarbonate of an intrinsic viscosity of 0.490 and a flame resistance of V-O rating by the Bulletin-94 test.

EXAMPLE 9

Repeating the procedure of Example 7 with 4,4'-(1H-trifluoroethylidene)bis(2,6-dimethylphenol) in place of 4,4'-(1H-perfluorobutylidene)bisphenol yielded a polycarbonate of the intrinsic viscosity of 0.412 that was V-O in the Bulletin-94 test.

While the invention has been described with respect to preferred emodiments, it will be apparent that certain modifications and changes can be made without departing from the spirit and scope of the invention and, therefore, it is intended that the foregoing disclosure be limited only by the claims appended hereto.

What is claimed is:

1. A high-molecular weight aromatic polycarbonate having improved flame-retardance, said polycarbonate having the general formula:

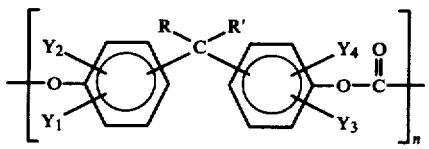

wherein n is an integer from 5 to 1,000; R is a radical selected from the group consisting of a fluorinated alkyl radical having from three to about twenty-two carbon atoms and a fluorinated aryl radical; R' is selected from the group consisting of fluorinated alkyl radical, fluorinated aryl radical, alkyl radical and hydrogen; and $Y_1$, $Y_2$, $Y_3$ and $Y_4$ are each independently selected from the group consisting of hydrogen, alkyl radical, chlorine and bromine.

2. The high-molecular weight polycarbonate of claim 1, wherein R is a straight chain or branched fluorinated alkyl radical.

3. The high-molecular weight polycarbonate of claim 1, wherein R is a perfluorinated alkyl radical.

4. The high-molecular weight polycarbonate of claim 1, wherein R is a fluorinated aryl radical having from 6 to about 16 carbon atoms.

5. The high-molecular weight polycarbonate of claims 1 or 4, wherein R is a perfluorinated aryl radical.

6. The high-molecular weight polycarbonate of claim 1, wherein R' is an alkyl radical having from 1 to about 6 carbon atoms.

7. The high-molecular weight polycarbonate of claim 1, wherein the alkyl radical of $Y_1$, $Y_2$, $Y_3$ or $Y_4$ is from about 1 to about 4 carbon atoms.

8. A high-molecular weight copolycarbonate composition of matter having improved flame retardance comprising units derived from:

(a) a fluorinated bisphenol having the general formula:

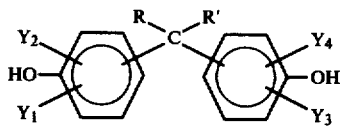

(b) a non-fluorinated bisphenol having the general formula:

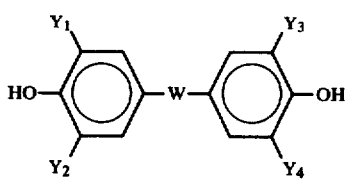

wherein R is a radical selected from the group consisting of a fluorinated alkyl radical and a fluorinated aryl radical; R' is selected from the group consisting of fluorinated alkyl radical, fluorinated aryl radical, alkyl radical and hydrogen; $Y_1$, $Y_2$, $Y_3$ and $Y_4$ are each independently selected from the group consisting of hydrogen, alkyl radical, chlorine and bromine; and W is selected from the group consisting of $C_1$–$C_9$ alkylene, $C_2$–$C_9$ alkylidene, $C_5$–$C_{15}$ cycloalkylene, $C_5$–$C_{15}$ cycloalkylidene, a single bond, —O—, —S—, —SO—, —SO$_2$— and —CO— and (c) a carbonate precursor.

9. The high-molecular weight copolycarbonate of claim 8, having the formula:

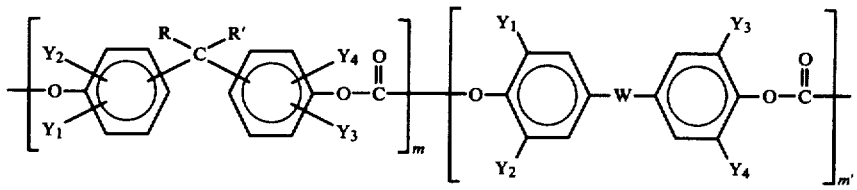

wherein R, R', $Y_1$, $Y_2$, $Y_3$, $Y_4$ and W are defined in claim 8; m and m' are integers from 1 to 1,000; and m and m' is at least 5.

10. The high-molecular weight polycarbonate copolymer of claims 8 or 9, wherein R is a fluorinated alkyl radical having from about 1 to about 22 carbon atoms.

11. The high-molecular weight polycarbonate copolymer of claims 8 or 9, wherein R is a perfluorinated alkyl radical.

12. The high-molecular weight polycarbonate of claims 8 or 9, wherein R is a fluorinated aryl radical having from 6 to about 16 carbon atoms.

13. The high-molecular weight polycarbonate of claims 8 or 9, wherein R is a perfluorinated aryl radical.

14. The high-molecular weight polycarbonate of claims 8 or 9, wherein R' is an alkyl radical having from 1 to about 6 carbon atoms.

15. The high-molecular weight polycarbonate of claim 8, wherein the non-fluorinated bisphenol is 4,4'-isopropylidenediphenol.

16. The high-molecular weight polycarbonate copolymer of claims 8 or 9, wherein the alkyl radical of $Y_1$, $Y_2$, $Y_3$ or $Y_4$ is from about 1 to about 4 carbon atoms.

17. The high-molecular weight polycarbonate of claim 8, wherein the fluorinated bisphenol is 4,4'-(1H-trifluoroethylidene)bisphenol.

18. The high-molecular weight polycarbonate of claim 8, wherein the fluorinated bisphenol is 4,4'-(1-methyltrifluoroethylidene)bisphenol.

19. The high-molecular weight polycarbonate of claim 8, wherein the fluorinated bisphenol is 4,4'-(1-trifluoromethyltrifluoroethylidene)bisphenol.

20. The high molecular weight polycarbonate of claim 1, wherein the polycarbonate is derived from 4,4'-(1H-1,1-perfluorobutylidene)bisphenol.

21. A composition comprising a blend of
a. the high molecular weight aromatic polycarbonate having improved flame retardance, said polycarbonate having the general formula:

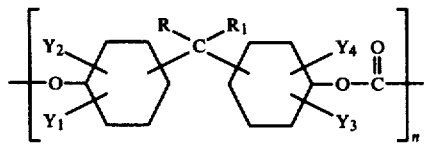

wherein n is an integer from 5 to 1,000; R is an radical selected from the group consisting of a fluorinated alkyl radical and a fluorinated aryl radical; $R^1$ is selected from the group consisting of fluorinated alkyl radical, fluorinated aryl radical, alkyl radical and hydrogen; and $Y_1$, $Y_2$, $Y_3$ and $Y_4$ are each independently selected from the group consisting of hydrogen, alkyl radical, chlorine and bromine; and b. a polymer selected from the group consisting of a polyester or non-fluorinated aromatic polycarbonate, said aromatic polycarbonate selected from the group consisting of linear aromatic polycarbonates, branched polycarbonates, and linear and branched aromatic polycarbonates.

22. The composition of claim 21, wherein the polymer is the non-fluorinated aromatic polycarbonate, said non-fluorinated aromatic polycarbonate derived from 4,4'-isopropylidene diphenol.

23. The composition of claim 21 wherein the polymer is polyester.

24. The composition of claims 21, 22 or 23 wherein R is a fluorinated alkyl radical having from 1 to about 22 carbon atoms.

25. The blend of claims 21, 22 or 23 wherein the flame retardant high molecular weight polycarbonate is derived from 4,4'-(1H-trifluoroethylidene)bisphenol.

26. The blend of claims 21, 22 or 23 wherein the flame retardant high molecular weight polycarbonate is derived from 4,4'-(1H-1,1-perfluoro-butylidene) bisphenol.

27. The blend of claims 21, 22 or 23 wherein the flame retardant high molecular weight polycarbonate is derived from 4,4'-(1-trifluoromethyltrifluoroethylidene)-bisphenol.

28. The composition of claim 8 wherein R is a fluorinated alkyl radical having from three to about twenty-two carbon atoms, inclusive, and a fluorinated aryl radical.

* * * * *